(12) United States Patent
Seille et al.

(10) Patent No.: US 12,491,805 B2
(45) Date of Patent: Dec. 9, 2025

(54) BENCH FOR UTILITY AUTOMOTIVE VEHICLE

(71) Applicant: FAURECIA Sièges d'Automobile, Nanterre (FR)

(72) Inventors: Sébastien Seille, Briis Sous Forges (FR); Claude Duboulet, Etrechy (FR); Nicolas Coutelle, Saclas (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 754 days.

(21) Appl. No.: 17/530,882

(22) Filed: Nov. 19, 2021

(65) Prior Publication Data

US 2022/0161700 A1    May 26, 2022

(30) Foreign Application Priority Data

Nov. 20, 2020 (FR) ..................... 20 11941

(51) Int. Cl.
    *B60N 2/68* (2006.01)

(52) U.S. Cl.
    CPC ............ *B60N 2/68* (2013.01); *B60N 2205/35* (2013.01)

(58) Field of Classification Search
    CPC ........ B60N 2/68; B60N 2205/35; B60N 2/24; B60N 2/4249; B60N 2/688; B60N 2/4221
    USPC ........ 296/63, 65.02, 187.01, 197.03, 197.12, 296/68.1, 65.01; 297/216.1, 216.14, 297/216.2
    See application file for complete search history.

(56) References Cited

U.S. PATENT DOCUMENTS

| 3,885,810 | A  | * | 5/1975 | Chika | B60N 2/688 |
|           |    |   |        |       | 296/68.1   |
| 5,178,434 | A  | * | 1/1993 | Krebs | B62D 43/10 |
|           |    |   |        |       | 296/97.23  |
| 5,407,244 | A  | * | 4/1995 | Nakano | B60N 2/68 |
|           |    |   |        |       | 296/68.1   |
| 5,746,476 | A  | * | 5/1998 | Novak | B60N 2/68  |
|           |    |   |        |       | 297/483    |
| 6,176,543 | B1 | * | 1/2001 | Nawata | B60N 2/4228 |
|           |    |   |        |       | 296/68.1   |
| 6,554,356 | B1 | * | 4/2003 | Crose | B60N 2/68   |
|           |    |   |        |       | 297/216.13 |
| 6,857,698 | B2 | * | 2/2005 | Saberan | B60N 2/4249 |
|           |    |   |         |       | 296/68.1   |

(Continued)

FOREIGN PATENT DOCUMENTS

| CN | 102923030 A | 2/2013 |
| GB | 2287645 A | 9/1995 |

(Continued)

*Primary Examiner* — Joseph D. Pape
*Assistant Examiner* — Veronica M Condo
(74) *Attorney, Agent, or Firm* — Barnes & Thornburg LLP

(57) ABSTRACT

A bench for a utility automotive vehicle, adapted to be installed transversely, in the front of a utility automotive vehicle, wherein the bench has a seat bottom framework and a seatback framework. The seat bottom framework comprises two lateral side plates, a first crosspiece and a second crosspiece with the first and second crosspieces each being fixed to each side plate. The seatback framework comprises at least two risers near the first crosspiece. Each riser is fixed to a respective side plate of the seat bottom framework such that in case of impact, the two risers come into contact with the first crosspiece in order to limit the deformation of the bench.

19 Claims, 2 Drawing Sheets

(56) References Cited

U.S. PATENT DOCUMENTS

Figure 1:
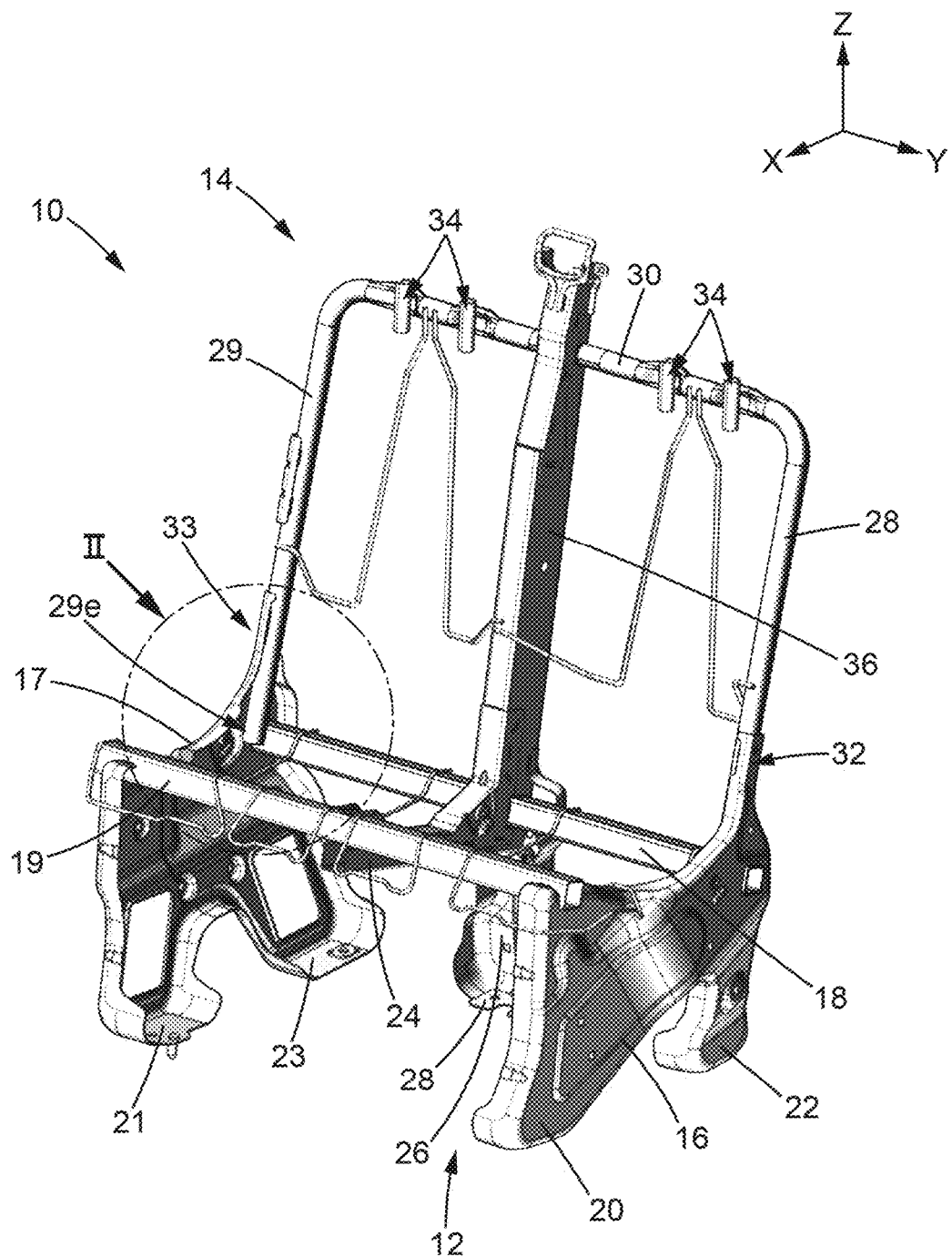

| | | | |
|---|---|---|---|
| 7,066,552 B2* | 6/2006 | Yoshida | B60N 2/4228 297/452.18 |
| 8,123,293 B2 | 2/2012 | Marriott | |
| 8,152,215 B1* | 4/2012 | Tsumiyama | B60N 2/015 297/354.1 |
| 8,833,849 B2* | 9/2014 | Ishimoto | B60N 2/68 297/216.13 |
| 8,845,019 B2* | 9/2014 | Sawada | B60N 2/4214 297/216.1 |
| 9,079,516 B2* | 7/2015 | Petit | B60R 5/006 |
| 10,227,023 B2 | 3/2019 | Lasell | |
| 2005/0110328 A1 | 5/2005 | Kennedy | |
| 2005/0275211 A1 | 12/2005 | Kennedy | |
| 2008/0164732 A1* | 7/2008 | Valasin | B60R 22/023 297/216.13 |
| 2013/0187418 A1* | 7/2013 | Watanabe | B60N 2/888 297/354.1 |
| 2021/0221262 A1* | 7/2021 | Caye | B60N 2/24 |

FOREIGN PATENT DOCUMENTS

| | | |
|---|---|---|
| WO | 1996038318 A | 12/1996 |
| WO | 2012007689 A | 1/2012 |

* cited by examiner

BENCH FOR UTILITY AUTOMOTIVE VEHICLE

PRIORITY CLAIM

This application claims priority to French Patent Application FR 20 11941, filed Nov. 20, 2020, which is expressly incorporated by reference herein.

BACKGROUND

The present description relates to a bench for a utility automotive vehicle. Such a bench is generally installed transversely, in the front of a utility automotive vehicle.

SUMMARY

According to the present disclosure, a bench for a utility automotive may be installed transversely, in the front of a utility automotive vehicle, where the bench has a seat bottom framework and a seatback framework.

In illustrative embodiments, the seat bottom framework comprises two lateral side plates, a first crosspiece and a second crosspiece with the first and second crosspieces each being fixed to each side plate.

In illustrative embodiments, the seatback framework comprises at least two risers near the first crosspiece.

In illustrative embodiments, each riser is fixed to a respective side plate of the seat bottom framework such that in case of impact the two risers come into contact with the first crosspiece in order to limit the deformation of the bench.

In illustrative embodiments, advantageously, in case of front impact, the framework of the bench deforms until the risers come to bear against the first crosspiece. At that point, this first crosspiece reinforces the risers and limits, or even blocks, any subsequent deformation tending towards a folding of the framework onto itself.

In illustrative embodiments, the bench comprises one or more of the following characteristics taken alone or in combination:

- a respective end of each riser extends substantially across from the first crosspiece along a longitudinal direction of the bench;
- the distance between the first crosspiece and each of the two risers is included between 0 and 50 mm, preferably between 1 and 20 mm, still more preferably between 1 and 10 mm, and most preferably between 1 and 5 mm;
- the seatback framework comprises a top crosspiece connecting the two risers;
- the top crosspiece and the at least two risers are unitary;
- the top crosspiece and the at least two risers are formed by distinct parts, fixed together;
- the at least two risers and the top crosspiece, as applicable, are tubular, in particular with circular section;
- at least one among the first crosspiece and the second crosspiece is cylindrical, preferably with a square cross-section;
- each of the side plates of the seat bottom frame forms a housing for receiving a portion of a respective riser;
- the bench comprises a seatbelt support beam, secured to the first crosspiece and, preferably, to the top crosspiece, as applicable, the beam being more preferably substantially halfway between the two risers;
- the seat bottom framework further comprises a stringer extending between the first crosspiece and the second crosspiece; and
- the seat bottom framework comprises a base, forming a foot of the bench, where the base is preferably secured to the beam and/or the stringer, as applicable.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
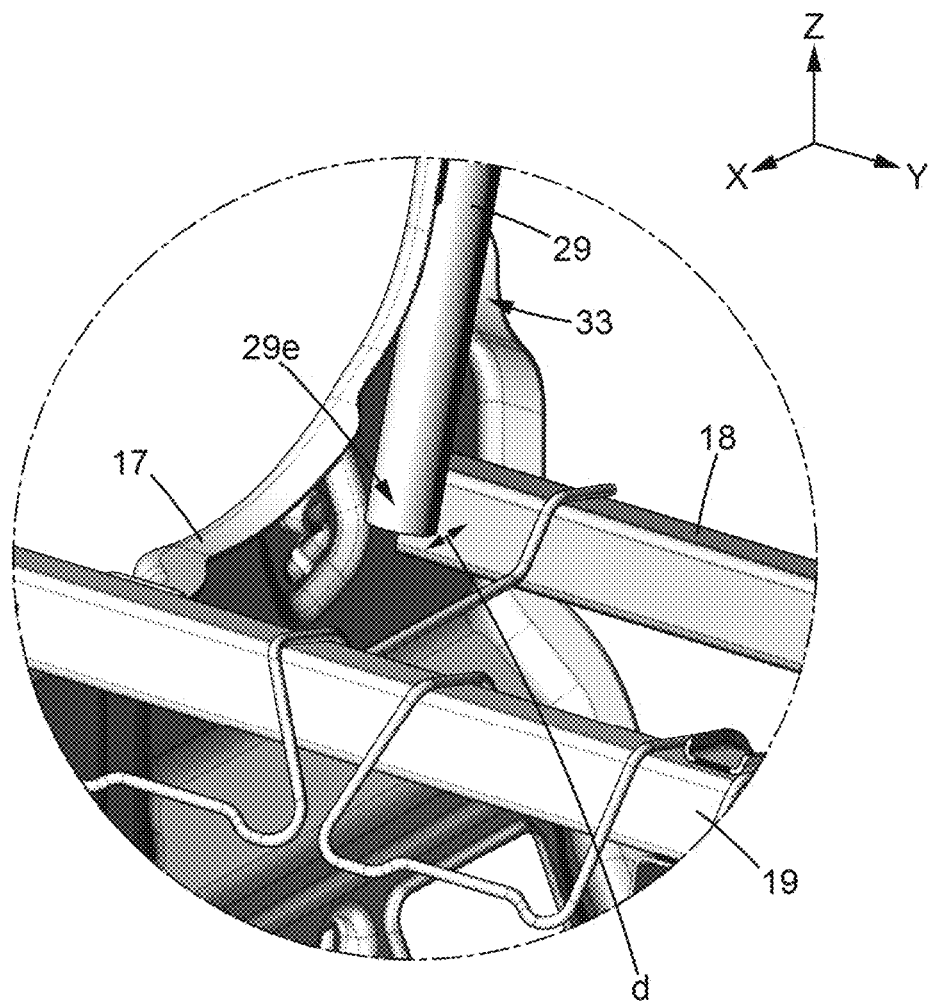

The detailed description particularly refers to the accompanying figures in which:

FIG. 1 schematically shows in perspective a sample bench for utility vehicles and FIG. 2 shows a detail from FIG. 1.

DETAILED DESCRIPTION

In the various figures, the same references designate identical or similar items. In the interest of conciseness, only the elements, which are useful for understanding the embodiment described, are shown on the figures and are described in detail in the following.

In the following description, when referring to absolute position qualifiers, such as the terms "front," "rear," "top," "bottom," "left," "right," etc., or relative, such as the terms "above," "below," "upper," "lower," etc., or orientation qualifiers such as "horizontal," "vertical," etc., unless otherwise indicated reference is made to the orientation of the figures or to a utility automotive vehicle bench in the normal position of use thereof.

In particular, the longitudinal direction X extends in the longitudinal direction of the bench. The longitudinal direction of the bench is considered to be the same as the longitudinal direction of the utility automotive vehicle in which the bench is mounted. This longitudinal direction X corresponds to the normal direction of forward movement of the automotive vehicle. The longitudinal direction X is horizontal. The transverse direction Y of the bench thus corresponds to the transverse or lateral direction of the automotive vehicle. This transverse direction corresponds to a direction perpendicular to the normal direction of forward motion of the vehicle. The transverse direction Y is horizontal. Finally, the vertical direction Z is a vertical direction of the bench, perpendicular to the longitudinal and transverse directions.

FIG. 1 shows a perspective view of the chassis 10 of a bench for a utility automotive vehicle. Such a bench is intended to be installed transversely in the automotive vehicle. In particular, the bench is intended to be installed transversely beside a driver's seat of the automotive vehicle. The bench 10, as shown, is suited for receiving two occupants.

Other than the chassis 10, the bench may comprise padding, for example foam, fixed to the chassis 10. One or more springs may be attached to the chassis 10 and receive the padding. The bench may also comprise one or more coverings in order to cover the padding. The one or more coverings may also help to keep the padding in position relative to the chassis 10.

The bench comprises a seat bottom and a seatback. Similarly, the chassis 10 of the bench comprises a seat bottom frame 12 and a seatback frame 14.

The seat bottom frame 12 comprises here two lateral side plates 16, 17 and two cross pieces 18, 19. Each side plate 16, 18 here forms two feet 20, 21, 22, 23 for attachment of the bench to the chassis of the utility automotive vehicle.

The seat bottom framework 12 further comprises a stringer 24 (or longitudinal beam 24). The stringer 24 here extends between the two cross pieces 18, 19. The stringer 24 is fixed to the two cross pieces 18, 19. For example, the stringer 24 may form a tightened receiving housing for the first crosspiece 18. The second crosspiece 19 may be welded to the stringer 24. Here, the stringer 24 is placed substantially halfway between the two lateral side plates 16, 17.

The cross pieces 18, 19 are cylindrical, for example. In the example shown, the cross pieces 18, 19 are cylindrical with square cross section.

The seat bottom framework 12 again comprises, according to the example shown, a base 26 extending from the stringer 24 to which it is secured. Here, the base 26 forms a fifth foot 28 of the bench, placed substantially halfway between the left 22 and right 24 rear feet.

Additionally, the seatback framework 14 comprises first and second risers 28, 29. The two risers 28, 29 are connected to each other by a crosspiece 30, referred to as top crosspiece in the following. The risers 28, 29 and the cross piece 30 may be formed as a single unit. Alternatively, the risers 28, 29 and the cross piece 30 are assembled with each other. In the example shown, the risers 28, 29 and the top crosspiece 30 are tubular with circular section.

Each riser 28, 29 is received in a housing 32, 33 formed by a respective lateral side plate 16, 17. In the case at hand, each riser 28, 29 is received tightened in the associated housing 32, 33. Each riser 28, 29 may be welded to a lateral side plate 16, 17 respectively, in the associated housing 32, 33. In that way, each riser 28, 29 is fixed to a lateral side plate 16, 17.

Further, here, each riser 28, 29 is fixed to a respective lateral side plate 16, 17 such that in case of front impact of the automotive vehicle, the first crosspiece 18 is suited to limit the deformation of the two risers 28, 29. The first crosspiece 18 may in particular limit the deformation of the framework 10 such that the top crosspiece 30 approaches the seat bottom framework 12, in particular the second crosspiece 19. Such a deformation of the framework 10 is very typical in case of front impact of the utility automotive vehicle equipped with a bench. Such deformation may be considered as a folding of the framework 10 on itself. In fact, according to this deformation, the seatback framework 14 tends to come facing the seat bottom framework 12.

In order to limit this deformation, in the example shown, each riser 28, 29 is fixed to the lateral side plates 16, 17 such that a respective end 29e of each riser 28, 29 extends into the area of the first crosspiece 18. More precisely the respective end 29e of each riser 28, 29 is facing, along the longitudinal direction X, the first crosspiece 18. In that way, in case of the deformation indicated above, the end 29e of the risers 28, 29 comes to bear against the first crosspiece 18. That then stiffens the risers 28, 29 which serves to limit or even prevent a greater deformation of the framework 10 tending to a folding of the framework 10 on itself such that the seatback framework 14 comes to face the seat bottom framework 12.

In order to further limit the deformation of the risers 28, 29 in case of front impact, the distance d between the first crosspiece 18 and the end 29e of each riser 28, 29, measured along the longitudinal direction X, may be included between 0 and 50 mm. In particular, the distance d may be greater than or equal to 1 mm and/or less than or equal to 20 mm, preferably less than or equal to 10 mm, even more preferably less than or equal to 5 mm. A nonzero distance d is preferred a priori. Indeed, contact between the risers 28, 29 and the cross piece 18 could result in noise in the vehicle's passenger compartment.

According to the example shown, the seatback framework 14 comprises cylindrical sockets 34 for receiving headrest support rods. The cylindrical sockets 34 are attached, in particular welded, onto the top crosspiece 30.

Finally, the seatback framework 14 comprises a beam 36 here extending along a direction substantially parallel to the direction of the risers 28, 29. Here, the beam 36 extends substantially halfway between the risers 28, 29. The beam 36 may in particular receive a safety belt winder device (not shown) for one of the occupants of the bench.

The beam 36 here forms a housing for receiving the first crosspiece 18 such that the beam 36 and the first crosspiece 18 are secured.

The beam 36 is also fixed to the top crosspieces 30 of the seatback framework 14.

The beam 36 and/or the stringer 24 and/or the base 26 may be formed from a single piece. Alternatively, the beam 36 and the stringer 24 and the base 26 may be assembled in order to form a rigidly connected assembly.

The present disclosure is not limited to only the examples described above but could, instead, be varied in many ways accessible to the person skilled in the art.

The utility automotive vehicle generally has a passenger compartment located in the front of the vehicle and a part for loading located towards the rear. Usually the passenger compartment comprises a driver seat and a bench which extends laterally next to the driver seat. The driver seat may receive the only driver, while the bench may generally receive two or even more passengers.

Such a bench should meet strict safety standards, in particular relating to deformations of the bench in case of front impact of the utility automotive vehicle. In case of front impact, in fact, the framework of the bench tends to deform, in particular to fold in on itself. Such a deformation is particularly dangerous for the one or more occupants of the bench.

One solution for satisfying these standards is to design a heavy structure for the bench, for example comprising reinforcing inserts. This solution is however unlikely in the automotive field where the mass of such a bench would tend to significantly increase the consumption of the automotive utility vehicle.

There is therefore a need for a utility automotive vehicle bench providing good mechanical strength, in particular in case of front impact, while still having a limited mass.

For this purpose, a bench for a utility automotive vehicle is described, which is intended to be installed transversely, in the front of a utility automotive vehicle, where the bench has a seat bottom framework and a seatback framework, wherein the seat bottom framework comprises two lateral side plates, a first crosspiece and a second crosspiece with the first and second crosspieces each being fixed to each side plate, wherein the seatback framework comprises at least two risers near the first crosspiece, and wherein each riser is fixed to a respective side plate of the seat bottom framework such that in case of impact the two risers come into contact with the first crosspiece in order to limit the deformation of the bench.

Thus, advantageously, in case of front impact, the framework of the bench deforms until the risers come to bear against the first crosspiece. At that point, this first crosspiece reinforces the risers and limits, or even prevents, any subsequent deformation tending towards a folding of the framework onto itself.

According to some embodiments, the bench comprises one or more of the following characteristics taken alone or in combination:
- a respective end of each riser extends substantially across from the first crosspiece along a longitudinal direction of the bench;
- the distance between the first crosspiece and each of the two risers is included between 0 and 50 mm, preferably between 1 and 20 mm, still more preferably between 1 and 10 mm, and most preferably between 1 and 5 mm;
- the seatback framework comprises a top crosspiece connecting the two risers;
- the top crosspiece and the at least two risers are unitary;
- the top crosspiece and the at least two risers are formed by distinct parts, fixed together;
- the at least two risers and the top crosspiece, as applicable, are tubular, in particular with circular section;
- at least one among the first crosspiece and the second crosspiece is cylindrical, preferably with a square cross-section;
- each of the side plates of the seat bottom frame forms a housing for receiving a portion of a respective riser;
- the bench comprises a seatbelt support beam, secured to the first crosspiece and, preferably, to the top crosspiece, as applicable, the beam being more preferably substantially halfway between the two risers;
- the seat bottom framework further comprises a stringer extending between the first crosspiece and the second crosspiece; and
- the seat bottom framework comprises a base, forming a foot of the bench, where the base is preferably secured to the beam and/or the stringer, as applicable.

The invention claimed is:

1. A bench for a utility automotive vehicle, adapted to be installed transversely, in a front of the utility automotive vehicle, the bench comprising
   a seat bottom framework and
   a seatback framework,
   wherein the seat bottom framework comprises two lateral side plates, a first crosspiece and a second crosspiece with the first and second crosspieces each being fixed to each side plate,
   wherein the seatback framework comprises at least two risers near the first crosspiece,
   wherein each riser is fixed to a respective side plate of the seat bottom framework so that during a front impact on the utility automotive vehicle, the two risers move to contact the first crosspiece in order to limit a deformation of the bench,
   wherein a respective end of each riser extends substantially across from the first crosspiece, along a longitudinal direction of the bench, and in front of the first crosspiece, and
   wherein the first crosspiece and each of the two risers are spaced apart such that the ends of the each of the two risers move towards and engage the first crosspiece during the front impact.

2. The bench according to claim 1, wherein a distance between the first crosspiece and each of the two risers is less than 50 mm, and the distance is configured to decrease during the impact.

3. The bench according to claim 1, wherein the seatback framework comprises a top crosspiece connecting the two risers.

4. The bench according to claim 3, wherein the top crosspiece and the at least two risers are unitary.

5. The bench according to claim 3, wherein the top crosspiece and the at least two risers are formed by distinct parts, fixed together.

6. The bench according to claim 1, wherein the at least two risers are tubular.

7. The bench according claim 6, wherein the at least two risers have a circular cross section.

8. The bench according to claim 3, wherein the top crosspiece is tubular.

9. The bench according to claim 8, wherein the top crosspiece has a circular cross section.

10. The bench according to claim 1, wherein at least one among the first crosspiece and the second crosspiece is cylindrical.

11. The bench according to claim 1, wherein at least one among the first crosspiece and the second crosspiece is tubular, with a square cross-section.

12. The bench according to claim 1, wherein each of the side plates of the seat bottom frame forms a housing for receiving a portion of a respective riser.

13. The bench according to claim 1, wherein the bench comprises a seatbelt support beam, secured to the first crosspiece.

14. The bench according to claim 13, wherein the seatbelt support beam is substantially halfway between the two risers.

15. The bench according to claim 13, wherein the seatback framework comprises a top crosspiece connecting the two risers and wherein the seatbelt support beam is secured to the top crosspiece.

16. The bench according to claim 1, wherein the seat bottom framework further comprises a stringer extending between the first crosspiece and the second crosspiece.

17. The bench according to claim 1, wherein the seat bottom framework comprises a base, forming a foot of the bench.

18. The bench according to claim 17, wherein the bench comprises a seatbelt support beam, secured to the first crosspiece, and wherein the base is secured to the seatbelt support beam.

19. The bench according to claim 17, wherein the seat bottom framework comprises a stringer extending between the first crosspiece and the second crosspiece, and wherein the base is secured to the stringer.

* * * * *